United States Patent [19]

Inkol

[11] Patent Number: 5,363,103
[45] Date of Patent: Nov. 8, 1994

[54] METHOD FOR EVALUATING SIMILARITY OF SIGNALS HAVING A CARRIER FREQUENCY OFFSET

[75] Inventor: Robert J. Inkol, Orleans, Canada

[73] Assignee: Her Majesty the Queen as represented by the Minister of National Defence of Her Majesty's Canadian Government, Ottawa, Canada

[21] Appl. No.: 85,957

[22] Filed: Jul. 6, 1993

[30] Foreign Application Priority Data

Jan. 5, 1993 [CA] Canada .................................. 2086704

[51] Int. Cl.$^5$ .............................................. G01S 7/36
[52] U.S. Cl. .................................................... 342/13
[58] Field of Search .................. 342/13, 194, 195, 197

[56] References Cited

U.S. PATENT DOCUMENTS

| | | | |
|---|---|---|---|
| 4,090,145 | 5/1978 | Webb . | |
| 4,649,392 | 3/1987 | Apostolos | 342/192 |
| 5,091,917 | 2/1992 | Udd et al. | 375/10 |

OTHER PUBLICATIONS

Torrieri, Don J., "Arrival Time Estimation by Adaptive Thresholding", *IEEE Transactions of Aerospace and Electronic Systems*, pp. 178–184, vol. AES-10, No. 2, Mar. 1974.

F. Godon, et al., "A Memory Controller for Mapping and Array of Circular Buffers into a Ram", presented at Proceeding of the 33rd Midwest Symposium on Circuits and Systems on 12–15 Aug., 1990.

Y. T. Chan, et al., "Emitter Identification Using Frequency Deviations", presented at Proceedings of the 16th Biennial Symposium on Communications in Kingston, Ontario, Canada on May 27–29, 1992.

*Primary Examiner*—Mark Hellner
*Attorney, Agent, or Firm*—Larson and Taylor

[57] ABSTRACT

A method and apparatus for evaluating the similarity of multi-mode radar pulses detected by a passive ESM receiver. The method consists of fitting a straight line to the differential phase of pairs of received signals, one signal of a pair being a currently received signal pulse and the other a previously received signal pulse, by a best least squares fit method. The slope of that straight line gives the frequency offset between the signals and the mean square error between the actual phase-time data and the straight line indicates the similarity of the signals. A second measure of the similarity of the signals can be obtained by applying statistical tests for serial correlation in the difference between the phase-time data and the straight line.

21 Claims, 1 Drawing Sheet

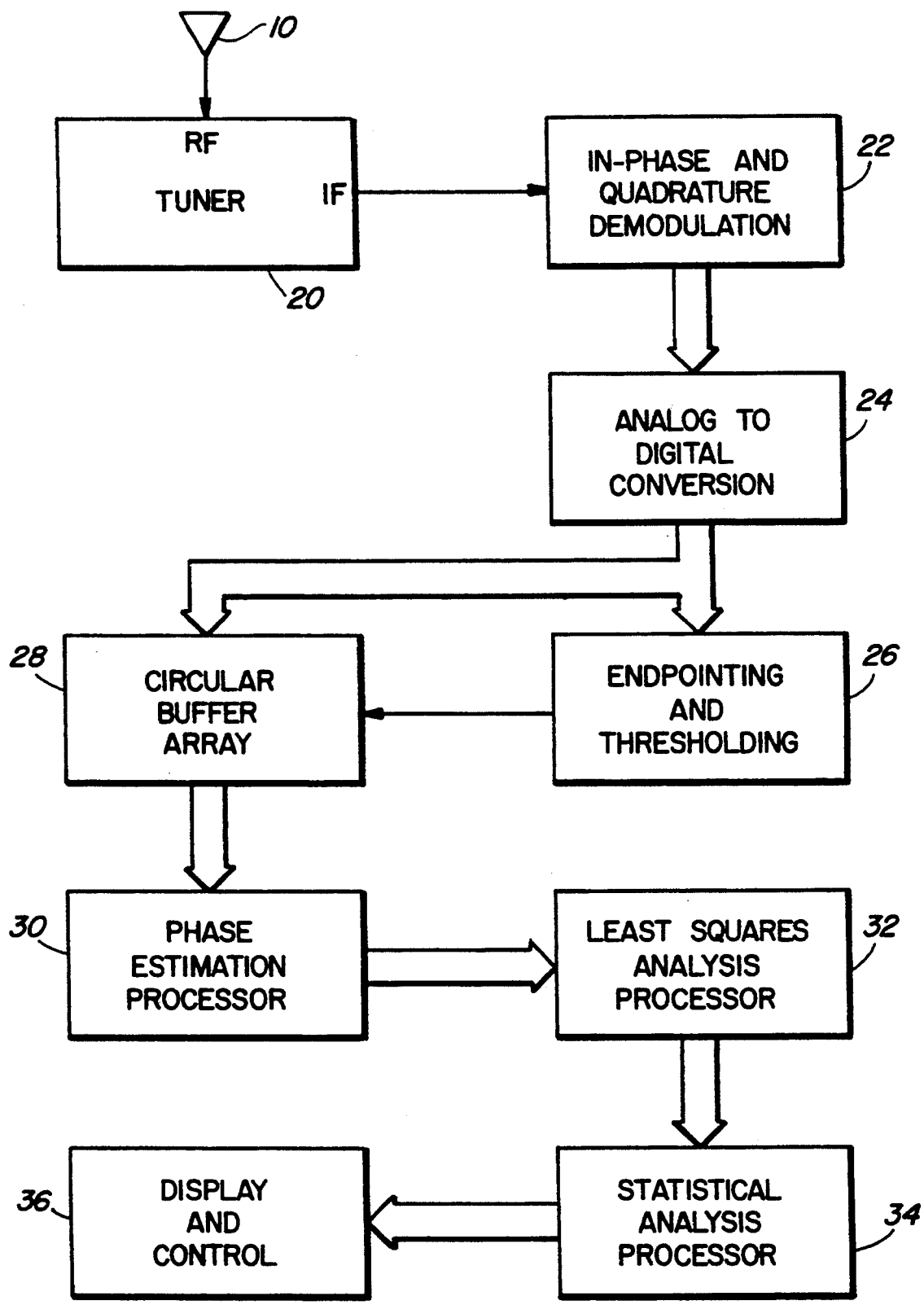

METHOD FOR EVALUATING SIMILARITY OF SIGNALS HAVING A CARRIER FREQUENCY OFFSET

FIELD OF THE INVENTION

The present invention is directed to methods and apparatus for characterizing, identifying and evaluating the similarity of radar pulses and in particular for evaluating the similarity of multi-mode radar pulses detected by passive Electronic Support Measures (ESM) systems.

BACKGROUND TO THE INVENTION

Present techniques to classify and identify radar pulses received by passive Electronic Warfare (EW) detection systems rely primarily on the monopulse measured parameters of carrier frequency, angle of arrival and pulse width as well as the intrapulse measured parameters of items such as pulse repetition interval and scan period. However, modern computer controlled multi-mode radars dynamically vary many of those parameters such as carrier frequency, pulse repetition interval and scan period in any arbitrary manner. Those parameters, as a result, are becoming insufficient to unambiguously discriminate between pulses from multi-mode radars having similar characteristics. Therefore, satisfactory results cannot always be obtained with present approaches to evaluate and classify pulses received from multi-mode radars.

Since it is becoming increasingly difficult to obtain satisfactory results with standard techniques, considerable effort is being directed at the problem of exploiting intrapulse information concerning the nature of the modulation information within radar pulses. Unfortunately, existing approaches to exploit information regarding amplitude and frequency/phase modulation of radar have various limitations since they are often dependent on a particular model of the detected signal. A polynomial model of the signal phase with time, for example, is very good for a linear chirp frequency modulation (quadrature phase) but poorly suited for signals having random discrete frequency modulation.

The need for a signal model can be avoided by directly comparing signals detected by a receiver. Each signal pulse can be compared with previously observed reference signals. When a match is found with one of the reference signals, this will infer that both of those signals were transmitted by the same radar. Otherwise, when a poor match is found between any two signals, it is concluded that a detected signal is transmitted by a new radar.

A simple implementation of this concept for directly comparing signals is to perform frequency demodulation on each signal being compared and, after subtracting the mean of each signal from itself, applying a suitable measurement criteria to determine the amount similarity between the signals. The amount of similarity between the signals will provide an indication of the goodness of the match between signals. The peak of the cross-correlation function has been used for this purpose. This approach has the advantage that carrier frequency offsets between the signals simply result in a shift of the demodulated signals that can easily be removed by subtracting the mean.

The frequency demodulation can be performed by wideband analog frequency demodulators which is a highly developed technology. However, frequency demodulation involves a differentiation of the signal phase and this generally emphasizes noise. A further problem is that signals having frequency modulation which is similar but differs by a scale factor may not be easily distinguishable using cross-correlation. These problems adversely affect the use of frequency demodulators in comparing radar pulses. Since many radars use linear frequency modulation, for instance, it is important to be able to distinguish small differences in the chirp rate.

SUMMARY OF THE INVENTION

It is an object of the present invention to provide a method and apparatus for identifying and evaluating the similarity of multi-mode radar signal pulses detected by a passive ESM receiver which avoids difficulties associated with present ESM techniques.

The method for evaluating the similarity of multi-mode radar signal pulses detected by a passive ESM receiver, according to the present invention, comprises determining the differential phase of pairs of received signals, one signal of each pair being a currently received signal and the other a previously received one, and fitting a straight line to the differential phase of pairs of signals wherein the slope of the line gives the frequency offset between the signals and the mean square error between the actual phase-time date and the straight line indicates the similarity of the signals.

An apparatus for evaluating the similarity of multi-mode radar signal pulses detected by a passive ESM receiver, according to a further embodiment of the present invention, comprises:

(1) means for estimation of the differential phase between two complex baseband radar signals detected by a passive ESM receiver;

(2) means for providing a least squares estimation of carrier frequency offset $\Delta f_c$ between received signals from said estimation of the differential phase and a weighting parameter $\Psi(nT)$; and (3) means for determining a cost function C from the signals, their frequency offset $\Delta f_c$ and the weighting parameter $\Psi(nT)$, wherein C is a measure of the similarity between pairs of signals.

BRIEF DESCRIPTION OF THE DRAWINGS

The following detailed description of the invention will be more readily understood when considered in conjunction with the accompanying single FIGURE which is a block diagram of an apparatus that provides a practical implementation of a method for evaluating the similarity of multi-mode radar pulses according to the present invention.

DESCRIPTION OF THE PREFERRED EMBODIMENTS

While it is difficult to generate simple and robust models for the frequency or phase time history relationship of a signal having incidental frequency modulation, this issue can be avoided by comparing the accumulated or unwrapped differential phase between two signals. If they are accurately aligned in time, the differential phase between two signals will have a linear component proportional to carrier frequency offset. Any deviations of the differential phase from such a model result from the following factors:

(1) Noise;
(2) Multipath propagation;

(3) Differences between the signal phase or frequency modulation of the signals;
(4) Imperfections in the quadrature demodulation system; and
(5) Phase noise in the receiver local oscillator.

These will differ in their statistical behaviour with wideband Gaussian noise introducing phase errors that are substantially uncorrelated from measurement-to-measurement whereas there will be substantial correlation of the phase errors produced by the factors (2) to (4). Multipath propagation effects, i.e. factor (2), can be further minimized by using a time weighting function to restrict processing to the first part of each pulse. This gives reduced weight to measurements at the trailing edge of a pulse which is the area most likely to be significantly degraded by noise or multipath signals.

It should be noted that doing a linear regression on the unwrapped phase difference has the incidental advantage that an accurate measurement of the difference in the signal carrier frequencies is obtained. This is potentially useful information since some radars using frequency synthesizers tune the transmitter carrier frequency in discrete steps.

The present invention uses a phase comparison algorithm for signal identification and a practical implementation of the concept uses the following steps:

1. Thresholding and endpointing;
2. Estimation of differential phase;
3. Least squares estimation of carrier frequency offset; and
4. Signal comparison.

In Step 1 (thresholding and endpointing), it is essential that the pair of signals to be compared are accurately aligned in time and that subsequent processing be restricted to a time interval corresponding to the presence of useful signal information. This can be performed as a two stage process. In the first stage, the amplitude $\sqrt{I^2(t)+Q^2(t)}$, (I being the In-phase component and Q the Quadrature component of the signal) of each signal is compared to a threshold to define the period during which significant signal power is present. This threshold is typically set to correspond to a signal-to-noise ratio of 20 dB in order to provide acceptable performance. Hysteresis can be used to avoid problems with pulse waveforms that might cross a single threshold several times.

Endpointing is performed to determine the positions in time of the leading and trailing edges of each pulse for the second stage in Step 1. Amplitude insensitive criteria, such as the position of the peak slope or the crossing of a threshold computed as a fraction of the peak amplitude, should be employed in determining the positions of leading and trailing edges for each pulse. A simple fixed threshold is unsatisfactory for this purpose since variations in the signal amplitude will affect the measured pulse width. It is possible to achieve sub-sample period resolution for the pulse endpoints by using interpolation, at least in principle. However, this would not normally be necessary given the relatively high sampling rates and bandwidth required to accommodate receiver tuning errors and minimize aliasing errors for waveforms having fast rise and fall times. The trailing edge of a pulse may be severely affected by multipath propagation. Therefore, the signal information processed may be limited to the first part of the pulse which will also minimize processing throughput requirements.

The estimation of differential phase in Step 2 can be performed either by subtracting explicit measurements of phases of individual complex baseband signals or, alternatively, can be determined from $$\phi_D(nT) = \arctan \frac{Q(nT)}{I(nT)} \quad (1)$$

The quantities $Q(nT)$ and $I(nT)$ in Equation (1) are the quadrature and in-phase components, respectively, of the product $Z_i(nT) Z_j(nT)^*$ where $Z_i(nT)$ and $Z_j(nT)$ are sampled complex baseband representations of the two signals. If the arctangent function is used to compute phase, it will be necessary to perform quadrant correction and phase unwrapping. Quadrant correction is necessary in order to extend the range from the interval $[-\pi/2,\pi/2]$ radians to $[-\pi,\pi]$ radians. This involves adding $\pi$ radians when Q and I have positive and negative signs respectively and subtracting $\pi$ radians when Q and I both have negative signs. This feature can be implemented in the Fortran IV function ARCTAN2. Phase unwrapping can be performed very simply if the phase change during a sample interval is less than $\pi/2$ radians by adding (subtracting) $2\pi$ radians when the sign of Q changes negative (positive) and I is negative.

The least squares estimation of carrier frequency offset in Step 3 can be provided by a least squares estimator for carrier frequency offset $\Delta f_c$ which is given by:

$$\Delta f_c = \frac{\sum_{n=0}^{N} \left( \psi(nT)\phi_D(nT)n - \left( \sum_{n=0}^{N} \psi(nT)n \left( \sum_{n=0}^{N} \psi(nT)\phi_D(nT) \right) \right) / \sum_{n=0}^{N} \psi(nT) \right)}{\left( \sum_{n=0}^{N} \psi(nT)n^2 - \sum_{n=0}^{N} \psi(nT)n / \sum_{n=0}^{N} \psi(nT) \right) 2\pi T} \quad (2)$$

where $\Psi(nT)$ is a weighting parameter intended to provide additional weight on phase difference measurements having low variance and $\phi_D(nT)$ is determined from Equation (1).

Since the variance of phase measurements is inversely proportional to signal-to-noise ratio and the signal-to-noise ratios of the signals are approximately proportional to the square of their amplitudes, assuming constant noise power, reasonable weights are given by:

$$\psi(nT) = \frac{|Z_i(nT)|^2 |Z_j(nT)|^2}{|Z_i(nT)|^2 + |Z_j(nT)|^2} \quad (3)$$

Simplified approximations of Equation (3) include $\Psi(nT)=|Z_i(nT)| \uparrow |Z_j(nT)| \uparrow$ and, for good minimum post-threshold signal-to-noise ratios, $\Psi(nT)=1$. The processing should be restricted to the duration defined by the signal pulse endpoints even when Equation (3) is employed since noise will result in non-zero $\Psi(nT)$ even when no signal is present $\Psi(nT)$.

Algorithms involving differential phase implicity assume that the signals are accurately aligned in time. In practice it may be desirable to select the best results obtained for a small range of relative time shifts to minimize the effects of noise on the endpointing. The possible time error of $\pm\frac{1}{2}$ sample period should not be particularly significant if the signals are oversampled.

The signal comparison performed in Step 4 provides a measure of the similarity of the phase or frequency modulation of a pair of signals being processed. This measure is given by a cost function C defined as the weighted mean square error of the least squares fit.

$$C = \frac{\sum_{n=0}^{N} \psi(nT) [\phi_D(nT) - \hat{\phi}_D(0) - 2\pi\Delta f_c nT]^2}{\sum_{n=0}^{N} \psi(nT)} \quad (4)$$

where $\hat{\phi}_D(0)$ is the least squares estimate for the initial phase given by $$\hat{\phi}_D(O) = \frac{\sum_{n=0}^{N} \psi(nT)\phi_D(nT)}{\sum_{n=0}^{N} \psi(nT)} - 2\pi \Delta f_c \frac{\sum_{n=0}^{N} \psi(nT)nT}{\sum_{n=0}^{N} \psi(nT)} \quad (5)$$

The ^ symbol indicates that this parameter is estimated. The cost function C reaches its minimum value of zero for infinite signal-to-noise ratios and perfectly time aligned signals having identical phase or frequency modulation.

Additional information concerning the nature of the relationship between $(\phi_D(nT) - \hat{\phi}_D(0))$ and $\Delta f_c nT$ can be obtained from the correlation of the residuals of the least squares straight line fit. A useful test based on theoretical distributions is given by the von Neumann ratio (VNR) test in which $$VNR = \frac{\sum_{n=0}^{N} [\phi_D(nT) - \phi_D(n-1)T - 2\pi\Delta f_c nT]^2/N}{\sum_{n=0}^{N} [\phi_D(nT) - \hat{\phi}_D(0) - 2\pi\Delta f_c nT]^2/(N+1)} \quad (6)$$

If the residuals have independent random Gaussian values, the VNR will have an expectation value of 2 for large N. Its value will be lower in the presence of significant serial correlation of the phase errors. This would be an indication that the residuals and therefore the result of the cost function given by Equation (4) are a result of mismatches in the phase or frequency modulation of the signals being processed rather than noise.

The cost function or VNR is used to determine if new signal data matches that from previously observed signals. The lowest (highest) cost function (VNR) estimate is first determined. Then, secondly, this result is compared with a threshold to determine if a match decision should be declared. The actual threshold should be determined empirically since it will depend on the degree to which radars in the signal environment are different. It will also depend on factors such as multipath propagation and other sources of error.

FIG. 1 is a block diagram of a circuit to illustrate a practical implementation for evaluating the similarity of multi-mode radar pulses according to the present invention. In FIG. 1, a signal received by an antenna 10 is amplified and shifted to a fixed intermediate frequency (IF) by a tuner 20. The IF signal from tuner 20 is then applied to an in-phase and quadrature demodulator 22 where in-phase and quadrature signals are generated. Those in-phase and quadrature signals are then digitized in an analog-to-digital (A/D) converter 24 which is connected to demodulator 22. One type of digital quadrature demodulator circuit which may be used to perform both of these operations is described in U.S. Pat. No. 4,090,145 by Webb. Digitized data from A/D converter 24 meeting a criteria of having sufficient signal energy for further processing is then stored in a buffer memory 28.

Newly stored data in the circular buffer array 28 will be compared to older data present in the buffer 28 in subsequent processing. Provisions can be made to clear or overwrite old signal data which is no longer of interest because a radar transmitter is inactive or that more recent data for the same radar transmitter is available in the buffer memory 28. This will avoid the need for having an excessively large buffer memory.

The memory 28 can be organized as an array of buffers by suitably addressing a large Random Access Memory (RAM). If that memory has $2^N$ address locations, it can be configured as $2^K$ buffers of $2^{N-K}$ word data locations. The K most significant address bits would then define the buffer selected and the remaining (N-K) address bits would define the location of the individual data words within the buffer. By using a resettable counter, the sequence of addresses required to either read or write the signal samples in the correct order can be generated. A memory controller implementing a similar idea has been developed for a different application as described by F. Godon et al on pages 646 to 648 of IEEE publication "Proceedings of the 33rd Midwest Symposium on Circuits and Systems", Aug. 12-15, 1990, Calgary, Alberta, Canada. Alternatively an array of First-In First-Out (FIFO) memory components can be used if provisions are made to rewrite data as it is read out.

The digitized in-phase and quadrature signal data from A/D converter 24 is thresholded and endpointed in processor 26 to determine sequences of signal samples corresponding to individual pulses with that data being forwarded to the circular buffer array 28. The thresholded and endpointed operations, as previously described in Step 1, can be implemented in a pipelined purpose built processor 26 which receives digitized signal data from the A/D converter 24 for real-time operation.

When a new signal is to be compared with one of the reference signals, the data for both signals in the circular buffer array 28 is accessed in the order in which it is stored and forwarded to the phase estimation processor 30. The differential phase data is then computed by the phase estimation processor 30 to provide an estimation of differential phase as previously described in Step 2. This computation by processor 30 involves multiplying the two signal data sequences on an element-by-element basis using a complex arithmetic multiplier and calculating the arctangent according to Equation (1). Quadrant correction and phase unwrapping are then performed by processor 30 as previously described in Step 2. The use of a Read Only Memory (ROM) lookup tables to estimate differential phase is described by Webb in U.S. Pat. No. 4,090,145.

The differential phase data from processor 30 is then forwarded to an analysis processor 32 which provides a least squares estimation of carrier frequency offset. The least squares estimator for carrier frequency offset $\Delta f_c$ is determined by processor 32 according to Equation (2) from $\phi_D(nT)$ and weighting parameters $\Psi(nT)$ which are determined from Equation (3), or simplified approximations of Equation (3), as previously described in Step 3.

The data from the least squares analysis processor 32 is then forwarded to a statistical analysis processor 34 where a cost function C according to Equation (4) is computed which provides a measure of the similarity of the phase or frequency modulation between a pair of signals. The cost function C is defined as the weighted mean square error of the least square fit. The lowest cost function C value generated, between a new signal and reference signals, is then compared in statistical analysis processor 34 with a threshold to determine if a new signal matches any of the existing reference signals. If the new signal matches one of the reference signals, either the new signal data or the corresponding reference signal data can be overwritten in the buffer memory 28 when the next signal pulse is processed. This will save space in the buffer memory 28 and avoid the need for having an excessively large buffer memory available. However, when no match can be found for a new signal, that new signal data can be retained in the memory and used as a reference signal for processing with detected signal pulses which are subsequently receive.

The results of the processing by the statistical analysis processor 34 can be made available to a system operator via a video display 36 or transferred, via suitable data bus, to an electronic warfare system (EWS) to aid in resolving ambiguities in the processing and identification of signals.

The analysis processors, to which the differential phase data from processor 30 is transferred, can be implemented using one or more software programmable processors. With only one processor, the cost function C would be computed for the new signal and each of the reference signals for only one reference signal at a time. The use of multiple processors would permit the simultaneous, rather than serial, solution of the cost function C for a number of reference signals. This would, thereby, improve the maximum throughput for the system.

The control processor for an EWS, which may be implemented as a standard single board computer, performs functions such as tuning the tuner to receive signals of interest, setting its gain, setting the orientation of the antenna if it is directional and setting threshold levels. Any of these changes could result from either manual command of an operator or from requests by an EWS for additional information concerning signals that have been observed.

Various modifications may be made to the preferred embodiments without departing from the spirit and scope for the invention as defined in the appended claims.

The embodiments of the invention of which an exclusive property or privilege is claimed are defined as follows:

1. An apparatus for evaluating the similarity of multimode radar signals detected by a passive receiver said apparatus comprising a means to determine the differential phase of pairs of received signals, one signal of each pair being a currently received signal and the other a previously received signal, and means for fitting a straight line to the differential phase of pairs of signals wherein the slope of the line gives the frequency offset between signals and the mean square error between the actual phase-time data and the straight lines indicates the similarity of the signals.

2. An apparatus as defined in claim 1, wherein the means for fitting a straight line is a best least squares fit means.

3. An apparatus for evaluating the similarity of multimode radar signals detected by a receiver comprising:
   (1) means for estimation of the differential phase between two complex baseband radar signals detected by the receiver;
   (2) means for providing a least squares estimation of carrier frequency offset $\Delta f_c$ between detected signals from said estimation of the differential phase and a weighting parameter $\Psi(nT)$; and
   (3) means for determining a cost function C from said estimation of the differential phase between the signals, their frequency offset $\Delta f_c$ and the weighting parameter $\Psi(nT)$, wherein C is a measure of the similarity between pairs of signals.

4. An apparatus as defined in claim 3, wherein said means for estimation of the differential phase comprises means for subtracting explicit measurements of the phases of two individual complex baseband signals detected by the receiver.

5. An apparatus as defined in claim 3, wherein said estimation of the differential phase is $\phi_D(nT)$ where $$\phi_D(nT) = \arctan \frac{Q(nT)}{I(nT)}$$

with Q(nT) and I(nT) being the quadrature and in-phase components of the product $Z_i(nT)Z_j(nT)^*$, respectively, $Z_i(nT)$ and $Z_j(nT)$ being sampled complex baseband representations of the two signals.

6. An apparatus as defined in claim 5, wherein the means for providing a least squares estimation of carrier frequency offset $\Delta f_c$ comprises means for determining $\Delta f_c$ from the equation:

$$\Delta f_c = \frac{\sum_{n=o}^{N} \left( \psi(nT)\phi_D(nT)n - \left( \sum_{n=o}^{N} \psi(nT)n \left( \sum_{n=o}^{N} \psi(nT)\phi_D(nT) \right) \right) / \sum_{n=o}^{N} \psi(nT) \right)}{\left( \sum_{n=o}^{N} \psi(nT)n^2 - \sum_{n=o}^{N} \psi(nT)n / \sum_{n=o}^{N} \psi(nT) \right) 2\pi T}$$

7. An apparatus as defined in claim 6, wherein the weighting parameter $$\psi(nT) = \frac{|Z_i(nT)|^2 \, |Z_j(nT)|^2}{|Z_i(nT)|^2 + |Z_j(nT)|^2}.$$

8. An apparatus as defined in claim 3, wherein the means for determining the cost function C comprises means for determining C from the equation:

$$C = \frac{\sum_{n=0}^{N} \psi(nT) \, [\phi_D(nT) - \hat{\phi}_D(0) - 2\pi \Delta f_c nT]^2}{\sum_{n=0}^{N} \psi(nT)}$$

where $\phi_D(nT)$ is the differential phase for the nth signal sample from each signal sequence whose samples are taken at intervals of T and $\hat{\phi}_D(0)$ is the least squares estimate of the initial differential phase.

9. An apparatus as defined in claim 4, wherein the means for determining the cost function C comprises means for determining C from the equation:

$$C = \frac{\sum_{n=0}^{N} \psi(nT) [\phi_D(nT) - \hat{\phi}_D(0) - 2\pi\Delta f_c nT]^2}{\sum_{n=0}^{N} \psi(nT)}$$

where $\phi_D(nT)$ is the differential phase for the nth signal sample from each signal sequence whose samples are taken at intervals of T and $\hat{\phi}_D(0)$ is the least squares estimate of the initial differential phase.

10. An apparatus as defined in claim 5, wherein the means for determining the cost function C comprises means for determining C from the equation:

$$C = \frac{\sum_{n=0}^{N} \psi(nT) [\phi_D(nT) - \hat{\phi}_D(0) - 2\pi\Delta f_c nT]^2}{\sum_{n=0}^{N} \psi(nT)}$$

where $\phi_D(nT)$ is the differential phase for the nth signal sample from each signal sequence whose samples are taken at intervals of T and $\hat{\phi}_D(0)$ is the least squares estimate of the initial differential phase.

11. An apparatus as defined in claim 6, wherein the means for determining the cost function C comprises means for determining C from the equation:

$$C = \frac{\sum_{n=0}^{N} \psi(nT) [\phi_D(nT) - \hat{\phi}_D(0) - 2\pi\Delta f_c nT]^2}{\sum_{n=0}^{N} \psi(nT)}$$

where $\phi_D(nT)$ is the differential phase for the nth signal sample from each signal sequence whose samples are taken at intervals of T and $\hat{\phi}_D(0)$ is the least squares estimate of the initial differential phase.

12. An apparatus as defined in claim 7, wherein the means for determining the cost function C comprises means for determining C from the equation:

$$C = \frac{\sum_{n=0}^{N} \psi(nT) [\phi_D(nT) - \hat{\phi}_D(0) - 2\pi\Delta f_c nT]^2}{\sum_{n=0}^{N} \psi(nT)}$$

where $\phi_D(nT)$ is the differential phase for the nth signal sample from each signal sequence whose samples are taken at intervals of T and $\hat{\phi}_D(0)$ is the least squares estimate of the initial differential phase.

13. An apparatus as defined in claim 5, wherein the weighting parameter $$\psi(nT) = \frac{|Z_i(nT)|^2 |Z_j(nT)|^2}{|Z_i(nT)|^2 + |Z_j(nT)|^2}.$$

14. An apparatus as defined in claim 13, wherein the means for determining the cost function C comprises means for determining C from the equation:

$$C = \frac{\sum_{n=0}^{N} \psi(nT) [\phi_D(nT) - \hat{\phi}_D(0) - 2\pi\Delta f_c nT]^2}{\sum_{n=0}^{N} \psi(nT)}$$

where $\phi_D(nT)$ is the differential phase for the nth signal sample from each signal sequence whose samples are taken at intervals of T and $\hat{\phi}_D(0)$ is the least squares estimate of the initial differential phase.

15. An apparatus as defined in claim 3, wherein the weighting parameter $$\psi(nT) = \frac{|Z_i(nT)|^2 |Z_j(nT)|^2}{|Z_i(nT)|^2 + |Z_j(nT)|^2}$$

where $Z_i(nT)$ and $Z_j(nT)$ are sampled complex baseband representations of said pair of signals.

16. An apparatus as defined in claim 15, wherein the means for determining the cost function C comprises means for determining C from the equation:

$$C = \frac{\sum_{n=0}^{N} \psi(nT) [\phi_D(nT) - \hat{\phi}_D(0) - 2\pi\Delta f_c nT]^2}{\sum_{n=0}^{N} \psi(nT)}$$

where $\phi_D(nT)$ is the differential phase for the nth signal sample from each signal sequence whose samples are taken at intervals of T and $\hat{\phi}_D(0)$ is the least squares estimate of the initial differential phase.

17. An apparatus as defined in claim 6, wherein the weighting parameter $\Psi(nT) = |Z_i(nT)| \uparrow |Z_j(nT)| \uparrow$ for high signal-to-noise ratios.

18. An apparatus for evaluating the similarity of multi-mode radar signals detected by a receiver wherein an antenna for receiving radar signals is connected to the receiver which has a tuner for received signals and a demodulator for those signals with at least one analog-to-digital converter providing digitized in-phase and quadrature signal data of received radar signals, the apparatus comprising:

(1) a buffer memory to which the digitized in-phase and quadrature signal data is directed, that data being also applied to an endpointing and thresholding circuit that determines sequences of signal samples corresponding to individual pulses which is applied to the buffer memory where the received digitized signal data is stored;

(2) the memory being connected to a phase estimation processor which provides an estimation of the differential phase between pairs of signals from the memory, outputs of the phase estimation processor being directed to at least one analysis processor with (3) said at least one analysis processor providing a least squares estimation of carrier frequency offset $\Delta f_c$ that is forwarded to at least one statistical analysis processor which determines a cost function C providing a measure of the similarity of modulation between pairs of signals.

19. An apparatus as defined in claim 18, wherein the analysis processors are multiple software processors which determine a cost function C for a received signal and a number of reference signals stored in the memory simultaneously with the lowest value of C being compared with a threshold to determine if a newly received signal matches any of the existing reference signals stored in the memory.

20. An apparatus as defined in claim 6, wherein an additional means is provided for determining an alternative measure of the similarity between a pair of signals, the alternative measure being determined by a von Neumann ratio (VNR) test where $$VNR = \frac{\sum_{n=0}^{N} [\phi_D(nT) - \phi_D(n-1)T - 2\pi\Delta f_c nT]^2/N}{\sum_{n=0}^{N} [\phi_D(nT) - \phi_D(0) - 2\pi\Delta f_c nT]^2/(N+1)}.$$

21. An apparatus as defined in claim 6, wherein the weighting parameter $\Psi(nT) = 1$ for high signal-to-noise ratios.

* * * * *

UNITED STATES PATENT AND TRADEMARK OFFICE
CERTIFICATE OF CORRECTION

PATENT NO. : 5,363,103
DATED : November 8, 1994
INVENTOR(S) : INKOL, Robert J.

It is certified that error appears in the above-identified patent and that said Letters Patent is hereby corrected as shown below:

Column 4, line 59, change " $\psi(nT) = |Z_i(nT)\uparrow |Z_j(nT)\uparrow$ "

to read -- $\psi(nT) = |Z_i(nT)| \; |Z_j(nT)|$ --

Col. 10, line 35,
Claim 17, line 2, change " $\psi(nT) = |Z_i(nT)\uparrow |Z_j(nT)\uparrow$ "

to read -- $\psi(nT) = |Z_i(nT)| \; |Z_j(nT)|$ --.

Col. 9, line 3, change " $\phi_D(0)$ " to read -- $\hat{\phi}_D(0)$ --.

Signed and Sealed this

Fourth Day of April, 1995

Attest:

BRUCE LEHMAN

*Attesting Officer*  *Commissioner of Patents and Trademarks*